(12) United States Patent
Fang et al.

(10) Patent No.: US 11,481,687 B2
(45) Date of Patent: *Oct. 25, 2022

(54) MACHINE LEARNING AND SECURITY CLASSIFICATION OF USER ACCOUNTS

(71) Applicant: PAYPAL, INC., San Jose, CA (US)

(72) Inventors: Chuanyun Fang, Shanghai (CN); Matias Rotenberg, Tel-Aviv (IL); Adam Cohen, Ramat Gan (IL); Chunmao Ran, Shanghai (CN); Kun Fu, Shanghai (CN); Itzik Levi, Tel-Aviv (IL)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,407

(22) Filed: Oct. 30, 2021

(65) Prior Publication Data

US 2022/0051144 A1   Feb. 17, 2022

Related U.S. Application Data

(63) Continuation of application No. 16/026,037, filed on Jul. 2, 2018, now Pat. No. 11,238,368.

(51) Int. Cl.
*G06N 20/00* (2019.01)
*G06F 21/31* (2013.01)

(52) U.S. Cl.
CPC ............ *G06N 20/00* (2019.01); *G06F 21/31* (2013.01)

(58) Field of Classification Search
CPC ...... G06N 20/00; G06N 3/0454; G06N 7/005; G06N 20/10; G06N 5/003; G06N 20/20; G06F 21/31; G06F 21/604; G06F 21/552
See application file for complete search history.

(56) References Cited

U.S. PATENT DOCUMENTS

| | | | |
|---|---|---|---|
| 10,970,628 B2 | 4/2021 | Yu et al. | |
| 2010/0169137 A1 | 7/2010 | Jastrebski et al. | |
| 2017/0140382 A1 | 5/2017 | Chari | |
| 2019/0378051 A1 | 12/2019 | Widmann et al. | |
| 2019/0387007 A1 | 12/2019 | Muddu et al. | |
| 2020/0394707 A1 | 12/2020 | Guo | |

*Primary Examiner* — Beau D Spratt
*Assistant Examiner* — K C Chen
(74) *Attorney, Agent, or Firm* — Haynes and Boone, LLP

(57) ABSTRACT

Machine learning techniques are used in combination with graph data structures to perform automated classification of accounts. Graphs may be constructed using a seed node and then expanded outward to second-degree nodes and third-degree nodes that are connected to a seed user account node via direct interaction between the accounts. Characterization information regarding the interaction between accounts can be stored in the graph (e.g., quantity of interactions, types of interactions) as well as other metrics and metadata. A classifier, using random forest or another technique, may be trained using a number of different graphs that can then be used to reach a determination as to whether a user account falls into one particular category or another. These techniques can identify accounts that may be violating terms of service, committing a security violation, and/or performing illegal actions in a way that is not ascertainable from human analysis.

20 Claims, 8 Drawing Sheets

US 11,481,687 B2

MACHINE LEARNING AND SECURITY CLASSIFICATION OF USER ACCOUNTS

CROSS-REFERENCE TO RELATED APPLICATION

This application is a continuation of U.S. application Ser. No. 16/026,037, filed Jul. 2, 2018 and is incorporated herein by reference in its entirety.

TECHNICAL FIELD

This disclosure relates to enhancing account security via detecting certain user activities using machine learning and artificial intelligence, in various embodiments. More particularly, this disclosure relates to a particular machine learning architecture involving construction of a spatial graph linking user activities between user accounts over periods of time, in various embodiments.

BACKGROUND

Machine learning and artificial intelligence techniques can be used to improve various aspects of decision making. Machine learning techniques often involve using available data to construct a classifier that can produce an output (e.g. a decision) based on particular input data. Training data (e.g. known data and/or previously classified data) may be used such that the resulting trained classifier is capable of rendering a decision on unknown data. In some instances, machine learning can be applied to allow a computer system to make an assessment regarding user account activities and whether those account activities indicate the accounts may be violating security policies and/or whether the accounts are controlled by malicious actors.

DETAILED DESCRIPTION

Figure 1:
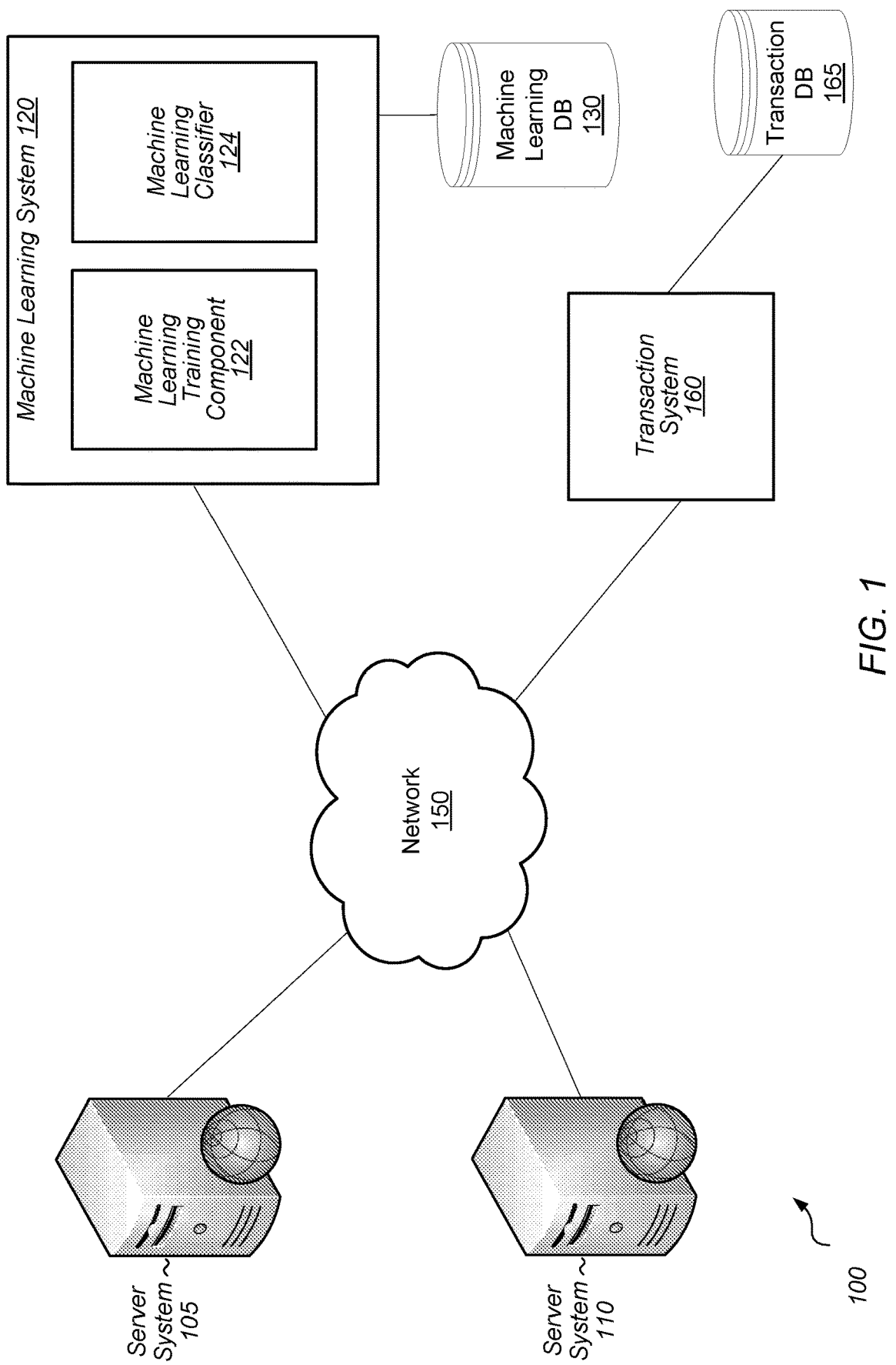
FIG. 1 illustrates a block diagram of a system that includes servers, a machine learning system, a transaction system, and a network, according to some embodiments.

As described herein, machine learning and artificial intelligence techniques can be leveraged to provide better security relative to user accounts (e.g. accounts controlled by one or more users).

User accounts may interact with other user accounts in various systems. These accounts may in some instances perform transactions with one another. These transactions may include transferring ownership of an asset (e.g. file permissions within a file system, digital ownership rights, an electronic payment transaction, or transfer of another electronic asset). When these transactions are recorded in a log and/or a database, a history of the transactions is developed. Certain account and transaction patterns may be indicative of certain types of actions performed by the user accounts, and in some cases, these actions may violate authorized use policies (AUPs) or otherwise be illegal and/or undesired by system owners. Identifying such patterns via human analysis may be difficult or impossible, however.

Thus, machine learning techniques can be used in combination with graph data structures that tell a story about the way user accounts interact with one another to identify when a user account has engaged or is likely to engage in particular types of behavior. Machine learning can be used to perform automated classification of accounts using this graph information. Graphs may be constructed using a seed node and then expanded outward to second-degree nodes (immediate neighbors to a seed account), third-degree nodes (two-hop neighbors), fourth-degree nodes (three-hop neighbors), or beyond. Nodes in the graph are connected by edges that may quantify and qualify the nature of interactions between accounts. In the case of electronic payment transactions, for example, the number of transactions, the amount of currency involved, whether or not any of the transactions were later disputed (as fraudulent or for another reason), etc., may be recorded in the graph. Whether other accounts connected to a seed account are also known to have engaged in particular undesirable behavior can also be reflected in the graph.

By generating graphs for a number of accounts that have been labeled as belonging to one of two or more categories (e.g. good account, bad account), a machine learning classifier can be generated that is usable to make a judgment as to whether an unclassified account belongs into a particular category. These techniques can identify accounts that may be violating terms of service, committing a security violation, and/or performing illegal actions in a way that is not easily ascertainable (or impossible to ascertain) from human analysis. This provides a technical advantage over previous techniques by reducing operational needs. For example, less computing power and storage space is wasted on accounts that are engaged in undesirable behavior, as those accounts may be terminated or have their access to functionality limited based on results of the trained machine learning classifier.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes server systems 105 and 110, a machine learning system 120, a transaction system 160, and a network 150. Also depicted is transaction DB (database) 165 and machine learning DB (database) 130. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

Server systems 105 and 110 may be any computing device configured to provide a service, in various embodiments. Services provided may include serving web pages (e.g. in response to a HTTP request) and/or providing an interface to transaction system 160 (e.g., a request to server system 105 to perform a transaction may be routed to transaction system 160). Machine learning system 120 may comprise one or more computing devices each having a processor and a memory, as may transaction system 160. Network 150 may comprise all or a portion of the Internet.

In various embodiments, machine learning system 120 can take operations related to training and/or operating machine learning classifier 124 (using machine learning training component 122). Both machine learning classifier 124 and machine learning training component 122 may comprise stored computer-executable instructions in various embodiments. Operations performed by machine learning system 120 may include using machine learning techniques to determine whether or not a particular user account has engaged in particular behavior (such as collusion and/or fraud) based on the activities of that account as well as other accounts to which that user account is connected via interaction (such as performing an electronic payment transaction, initiating a dispute or a chargeback, etc.).

Transaction system 160 may correspond to an electronic payment transaction service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™ In various embodiments, quantities other than currency may be exchanged via transaction system 160, including but not limited to stocks, commodities, gift cards, incentive points (e.g. from airlines or hotels), etc. Transaction system 160 may also correspond to a system providing functionalities such as API access, a file server, or another type of service with user accounts in some embodiments.

Transaction database (DB) 165 includes records related to various transactions taken by users of transaction system 160 in the embodiment shown. These records can include any number of details, such as any information related to a transaction or to an action taken by a user on a web page or an application installed on a computing device (e.g., the PayPal app on a smartphone). Many or all of the records in transaction database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details.

FIGS. 2A-2D will show one example of how a graph connecting different accounts can be created and grown. The example will start with one seed node (corresponding to a seed account) and then iterate to grow the graph. Steps may generally involve looking at immediate connections (e.g. other accounts the seed account has interacted with) and determining if those connections satisfy one or more inclusion criteria. The process can then be repeated with 3rd degree accounts. In this example, the graph has a depth of two (only two degrees of separate from leaf node to seed node) but this depth may vary by embodiment.

Figure 2B:
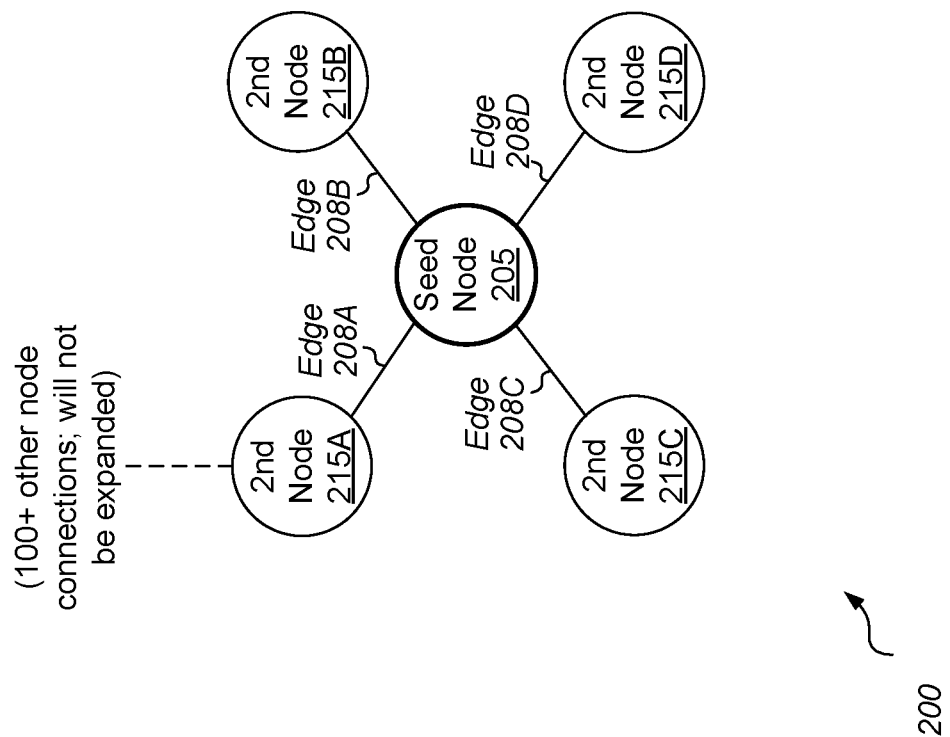
FIGS. 2A, 2B, 2C, and 2D illustrate a graph that is based on a seed account and may be used for machine learning purposes, in various stages of creation and construction, according to some embodiments.
Figure 2A:
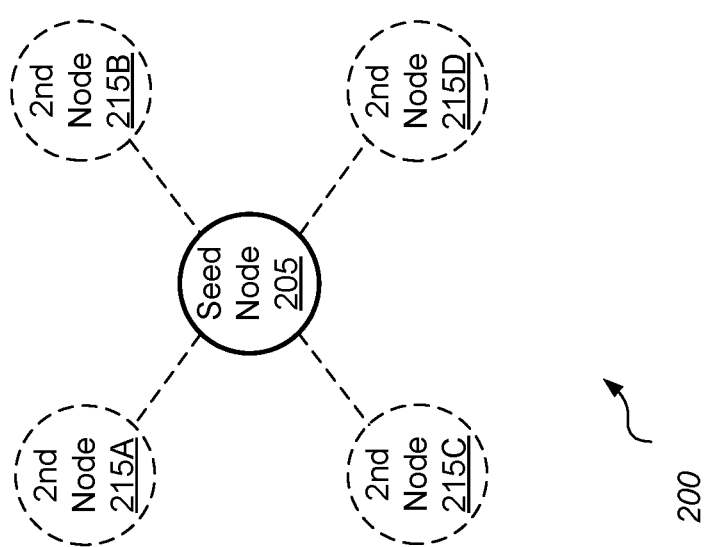

Turning to FIG. 2A, a block diagram is shown of one embodiment of a graph 200 that is under one phase of being constructed. This graph may be used to identify activity between particular accounts, in various embodiments. In a first phase of constructing graph 200, seed node 205 is selected. The seed node may be selected from multiple different possible seed nodes. In one example, the seed node is representative of a PayPal™ seller account selected from multiple seller accounts. Seller accounts maybe identified based on one or more various criteria: an account holder may inform PayPal™ (or another entity) that their account is being used to conduct sales, for example, or certain activity on the account may result in the account being classified as a seller account (e.g. a certain number of transactions within a certain period of time in which the account receives funds ("receiving transaction), a certain number of receiving transactions in which the amount is over a threshold such as $50, etc.).

Additional criteria may also be used to select a particular user account as a seed node for graph 200. For example, the account may have to have a threshold number of transactions in a particular time period (e.g. 20+ receiving transactions within the last 3 months, or some other number of transactions in a certain period). Account creation date, last use of account (e.g. transaction and/or login), or other factors may also be used.

Note that the process of building graph 200 may be repeated for all (or a subset) of a group of user accounts, in various embodiments. Thus, in some instances, a graph may be built for every seller account maintained by PayPal™ (or another entity), or every seller account meeting certain selection criteria.

In FIG. 2A, seed node 205 has been selected, and corresponds to a particular seller account. Seed node 205 may be stored within a graph data structure, along with attribute information for the particular account. Metadata information for the graph may also be stored for seed node 205, as further discussed below.

When building graph 200, the first step is to look at other accounts with which the seed node account has transacted (second degree accounts), in this example. These accounts correspond to 2nd nodes 215A, 215B, 215C, and 215D. As shown, these accounts have not yet been added to graph 200, but will be analyzed to determine which should be added to the graph.

Turning to FIG. 2B, a version of graph 200 is shown at a later time than in FIG. 2A, where some new nodes have been added to the graph (and some have not) after account analysis. One or more particular criteria may be used to determine which nodes (and which corresponding accounts) are actually added to the graph. For example, it may be desirable to keep the graph at a particular size and/or order of magnitude. In this example, 2nd node 215A has not been added to graph 200 because it had too many connections to other nodes and would have expanded the graph to a potentially unmanageable size. Different thresholds may be used—e.g., don't add a node if its account has had interactions (e.g. transactions) with more than 100 other nodes, more than 500 other nodes, more than 1,000 other nodes, or some other number. Additional screening criteria may be used to determine whether or not a new node (and the corresponding account) should be added to a graph, as further discussed below. In the present example, 2nd nodes 215B, 215C, and 215D have been added to graph 200 via edges 208B, 208C, and 208D.

These edges, within a graph data structure, may have their own attribute values that indicative information about the relationship between two particular nodes. These attributes could include number of interactions between accounts, type(s) of the interaction, volume of interactions, etc. For example, in the case of financial transactions between accounts, the edge attribute values might include number of transactions between accounts, dates and times of transactions, total volume (e.g. $2000 sent from A to B, $37.97 sent from B to A), and/or other information.

Figure 2C:
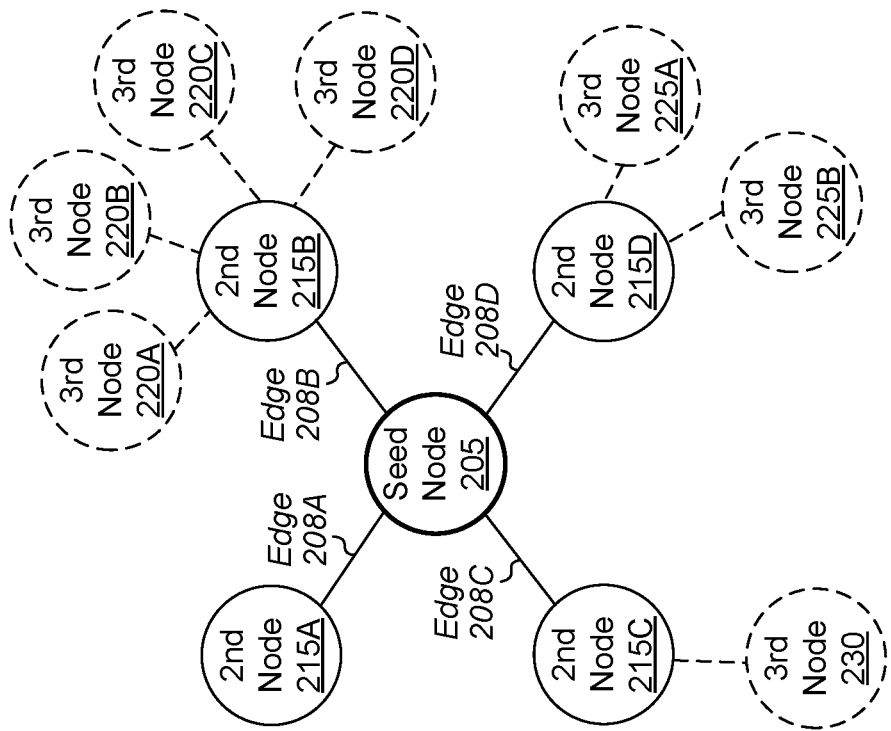

Turning to FIG. 2C, another diagram is shown of graph 200 at a later time. This figure shows 3rd degree nodes that have interacted with the 2nd degree nodes 215B, 215C, and 215D. The 3rd degree nodes include 220A, 220B, 220C, 220D, 225A, 225B, and 230. These nodes have not yet been added to the graph data structure that is used to represent graph 200, however.

Figure 2D:
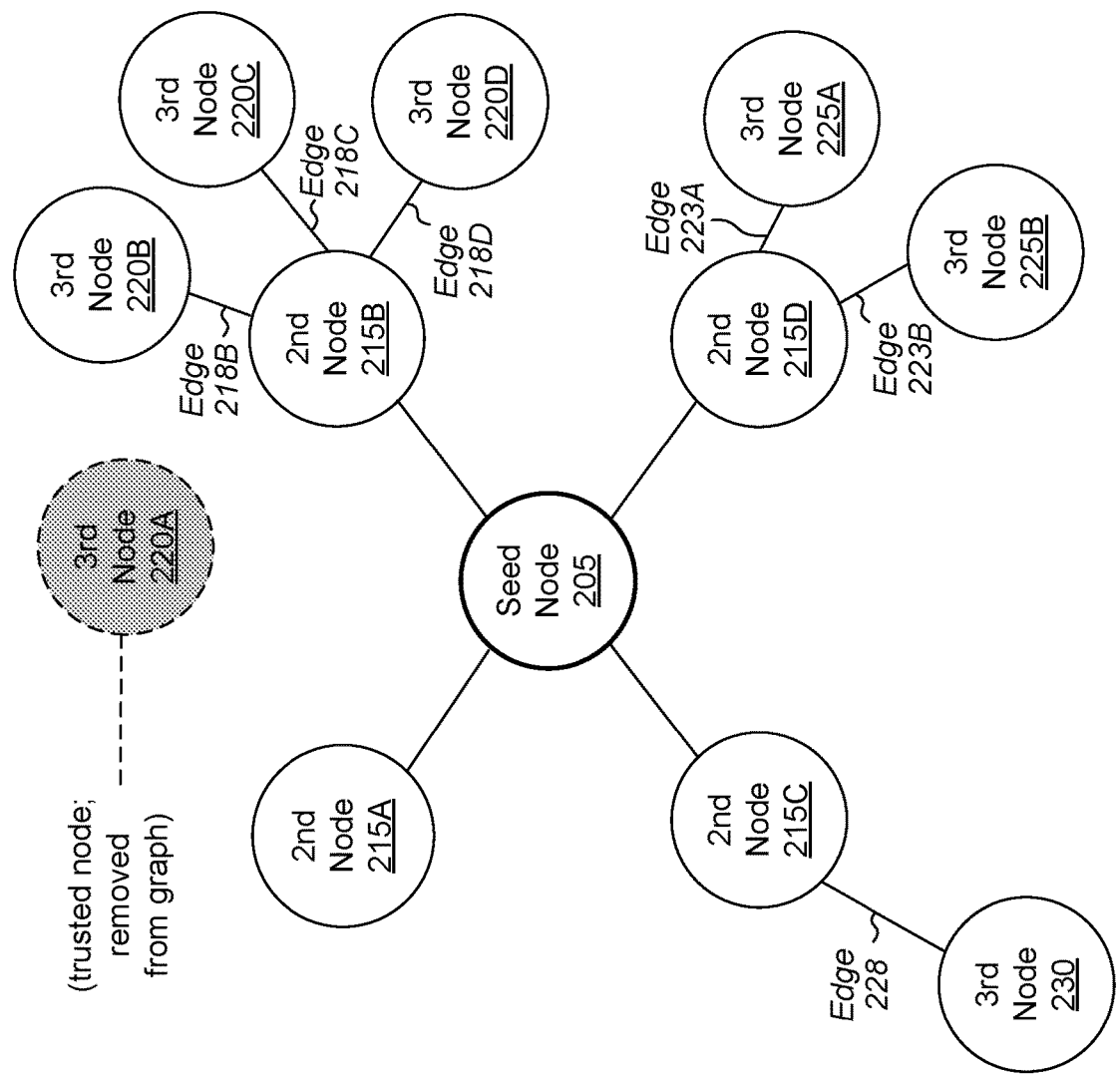

Turning to FIG. 2D, a diagram of graph 200 is shown with certain 3rd degree nodes having been added. In this case, the nodes that have been added are connected in the graph via edges 218B, 218C, 218D, 223A, 223B, and 228. 3rd node 220A has not been added to the graph, as its corresponding account failed to satisfy a screening criterion. (In this case, 3rd node 220A is considered a "trusted node" having a "trusted account". In cases where graph 200 is used to measure colluding, unauthorized, and/or fraudulent activity, it may make sense to exclude accounts that have a high confidence of being good actors from the graph. E.g., an account with 15 years of history, many transactions, and has never had a history of fraud or suspicious behavior may be a bad candidate for inclusion in graph 200; this will vary by embodiment, of course, as techniques described herein may be used for purposes other than collusion detection.)

Figure 3:
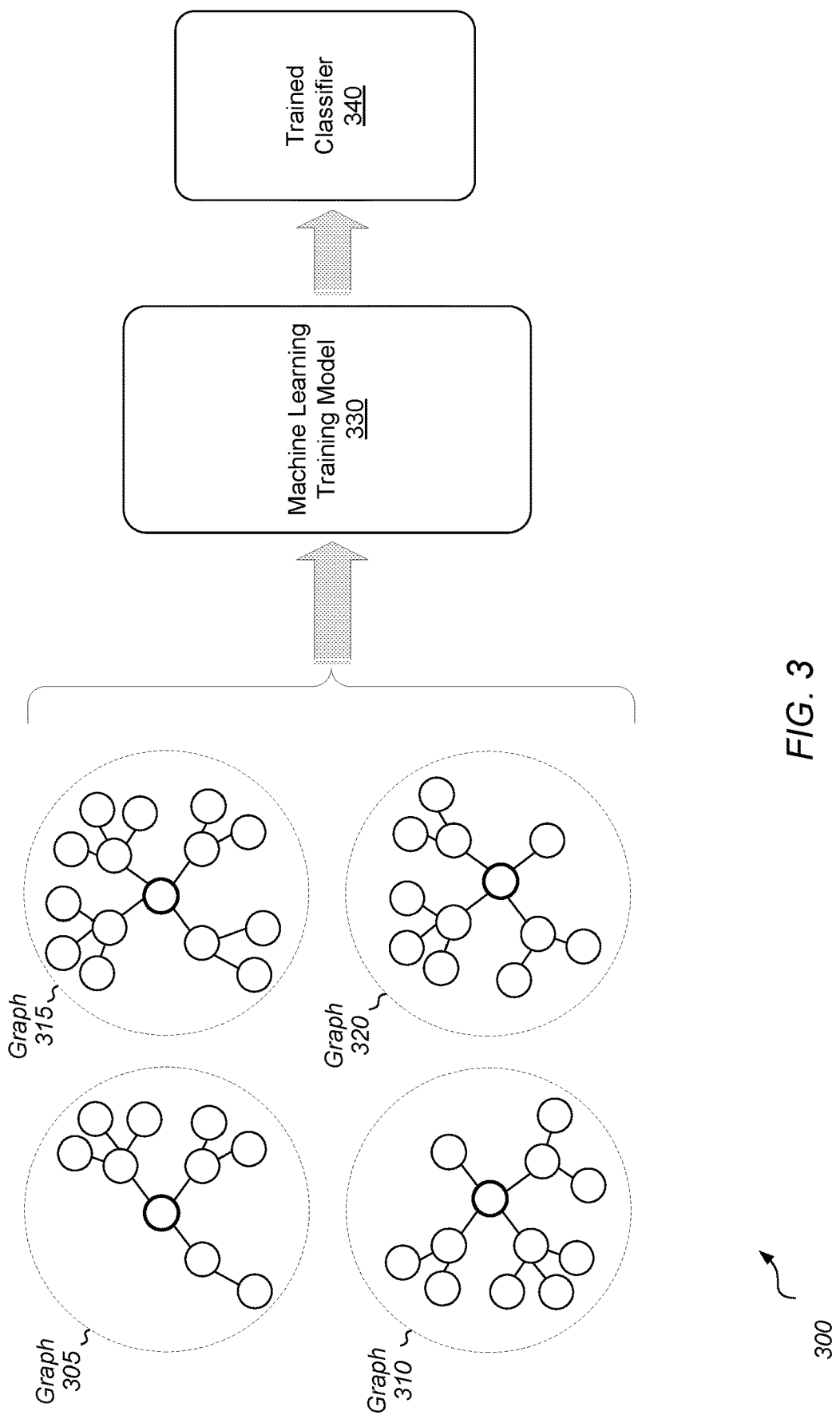
FIG. 3 is a diagram illustrating a logical flow of operations related to creating a trained machine learning classifier using account graphs, according to some embodiments.

Turning to FIG. 3, a diagram 300 is shown relating to a logical flow of operations for creating a trained classifier using account graphs such as graph 200. In this figure, a plurality of different graphs 305, 310, 315, and 320 are shown. Each of these graphs has a seed node and corresponding seed account, as well as additional nodes and corresponding accounts that are linked to the seed account through interactions (e.g. electronic payment transactions). Once a number of graphs have been assembled, they are input to machine learning training model 330, which then creates a trained classifier 340 (which can be used to make determinations on unknown accounts, e.g., whether an unknown seller account appears to be involved in fraud and/or collusion activity).

More particularly, machine learning training model 330 may receive a number of graph data structures (for a number of graphs) that it uses as a basis for determining whether an account is engaging in a particular activity (such as collusion with other accounts). Graphs used for the learning process are labeled prior to being fed into machine learning training model 330. Thus, graphs 305 and 315 may have labels indicating that the seed accounts in those graphs are known colluders (or have engaged in some other activity). Note generally that while operations discussed herein may specifically mention collusion as the activity that is trying to be detected, the disclosure is not limited as such, and the present techniques can be used to detect other user behavior(s) as well.

Machine learning model 330 is a random forest learning model in some embodiments, but may be any other type of learning model in various embodiments (e.g. logistic regression, gradient boosting tree (GBT), artificial neural network (ANN), support vector machine (SVM), multinomial naïve Bayes, etc.). During a training process, machine learning model 330 examines various labeled input data and adjusts certain internal parameters in order to optimize decision making capabilities, in various embodiments. The result is a trained classifier 340 that can be used on unknown data.

Figure 4:
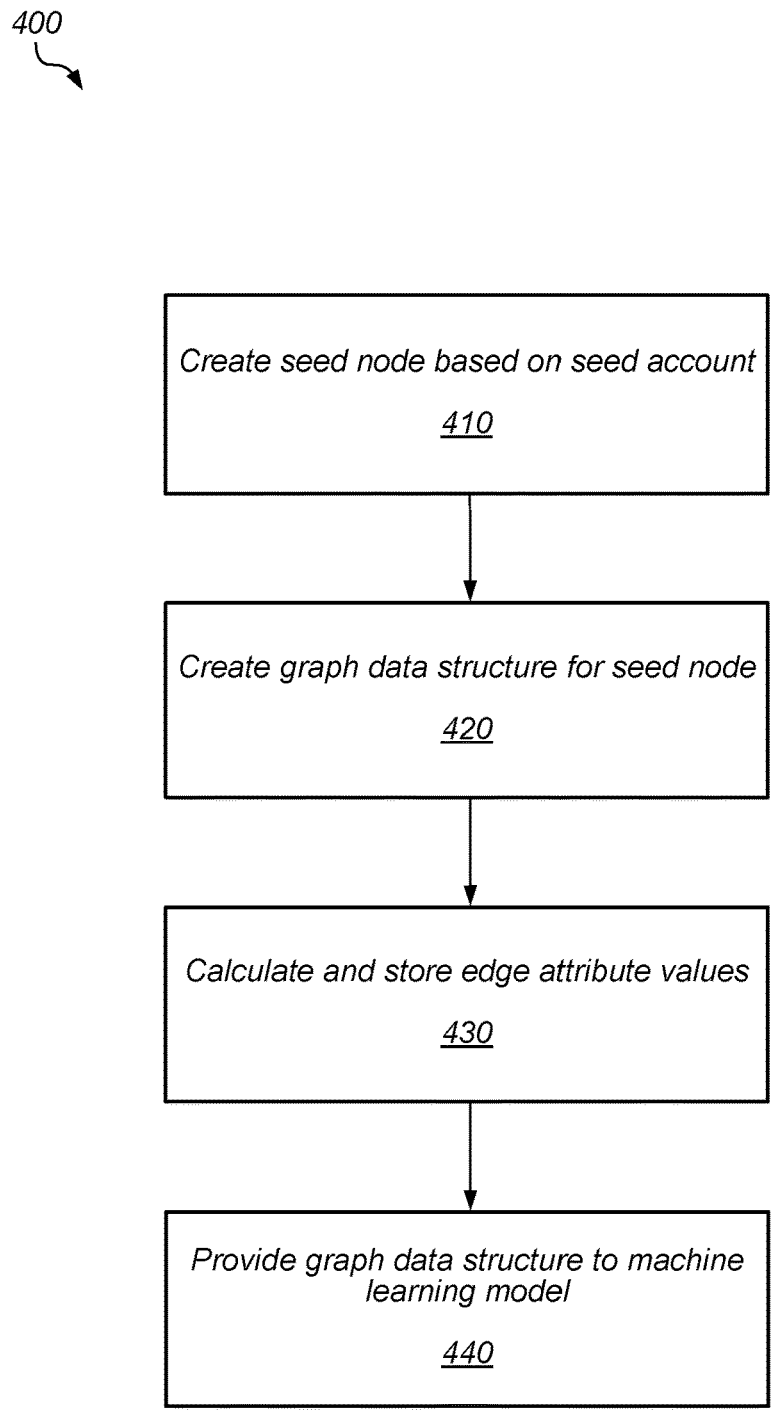
FIG. 4 illustrates a flow diagram of a method that relates to creating a graph data structure and providing it to a machine learning model, which may use it to help create a trained machine learning classifier, according to some embodiments.

Turning to FIG. 4, a flowchart is shown of one embodiment of a method 400 relating to creating a graph data structure and providing the graph data structure to a machine learning (ML) model.

Operations described relative to FIG. 4 may be performed, in various embodiments, by any suitable computer system and/or combination of computer systems, including machine learning system 120. For convenience and ease of explanation, however, operations described below will simply be discussed relative to machine learning system 120. Further, various elements of operations discussed below may be modified, omitted, and/or used in a different manner or different order than that indicated. Thus, in some embodiments, machine learning system 120 may perform one or more aspects described below, while another system might perform one or more other aspects.

In operation 410, machine learning system 120 creates a seed node based on a seed account that satisfies one or more selection criteria, according to various embodiments. The seed account may be a seller account (e.g. a user account that has received electronic payments). These payments may be made in currency, in some embodiments, or in other quantities as well (e.g. cryptocurrency, airline frequent flier miles, loyalty points, reward points, etc.). Note that generally, while this specification may refer to currency payments in various locations, other types of quantities may be used in various embodiments. Creating the seed node may also be done in combination with operation 420, described below.

In operation 420, machine learning system 120 creates a graph data structure for the seed node, according to various embodiments. This graph data structure may include information on other nodes that are connected to the seed node (e.g. information about other user accounts that are connected to the seed account for the graph). The graph data structure may be stored in any suitable organization format, and may include one or more vector lists in one embodiment. As another example, the graph data structure might store a node with a unique identifying value, along with an associated vector that stores various attribute data for the node (e.g. number of transactions engaged in within the last 12 months, number of dispute claims originated against other accounts, number of dispute claims originated against the node account by others, and many other pieces of data, in various embodiments). Edges may also be stored in the graph data structure as discussed below.

Operation 420 may also comprise various additional operations, including but not limited to determining one or more second-degree accounts with which the seed account has interacted (e.g. transacted). This may include analyzing a transaction history of the seed account to see which other user accounts the seed account has acted as a buyer (transferring money) or as a seller (receiving money). In one embodiment, the seed node in the graph data structures includes a list of some or all transactions the seed node has engaged in (or a pointer or other mechanism to access such data). Thus, this list can be traversed to determine the one or more second-degree accounts. Another account that has been transacted with multiple times (e.g. more than one purchase and/or sale) will only be added once to the graph, however, in various embodiments (e.g. no accounts are duplicated in the graph). As discussed below, edge data can be used to quantify the type of connection(s) between graph nodes.

Selection criteria may be applied when adding second-degree nodes to the graph data structure, and in some cases, an account that has interacted with the seed account will not be added to the graph for a variety of reasons, according to various embodiments. For example, a second-degree account that has a particularly large number of other connected accounts (third-degree accounts) may not be added to the graph. There are at least two reasons for this: first, an account with a large number of other connected accounts may be more likely to be a legitimate account, rather than an account used to commit fraud and/or collusion. Bad actors may be unlikely to establish an account that has transacted with 1,000 other accounts within the last 12 months, for example. Second, when the graph is further expanded to include third-degree accounts in various embodiments (as discussed below), the resulting size of the graph can be unwieldy for machine learning purposes.

Operation 420 may include adding one or more second-degree accounts as second-degree nodes connected to the seed node in the graph data structure. This step can include modifying the graph data structure to contain information on each of the nodes (e.g. accounts) that have been identified as interacting with the seed node, such as all accounts that have either paid money to or received money from the seed account. Thus, the graph data structure may be modified to include a reference to each of the one or more second-degree accounts.

Operation 420 may also include creating a first group of edges in the graph data structure indicating links between the seed node and each of the one or more second degree nodes. These edges can be represented in the graph data structure in various ways, such as a pair of values indicating the unique references for each of the two nodes that are connected (e.g. seed node and second-degree node). Similar to the nodes themselves, these edges can also have various attribute values. In some instances, these attribute values are indicative of the quantity, quality, and type of interactions between the two nodes connected via an edge.

Further, operation 420 may include building out the graph structure to a level of third-degree accounts. This process is similar or identical to the way in which the graph is expanded from seed node to the second-degree nodes, except in this instance, the graph is being expanded upon from each of the second degree nodes, in various embodiments. Thus, operation 420 may also comprise, for each of the one or more second-degree nodes added to the graph, adding the one or more third-degree accounts as third-degree nodes to the graph data structure. Operation 420 may further comprise, for each of the one or more second-degree nodes added to the graph, creating a second respective group of edges in the graph data structure indicating links between that second-degree node and the one or more third-degree nodes. The results of these processes is a graph where the seed node is connected to second-degree nodes, each of which may be connected to third-degree nodes, with the various edges and nodes having attribute values as desired.

The above techniques can also be used to expand a graph to greater number of degrees as well. If desired, for example, third-degree accounts can be analyzed to see what fourth-degree accounts they are connected to. Some or all of those fourth-degree accounts could be added to the graph as nodes, along with edges, and attribute values for the nodes and edges. The process can be further repeated if desired to expand the graph. Thus, graphs may include nodes that are one hop, two hops, three hops, four hops, or some other number of hops (in terms of connectedness) to a source node, and still be used accordingly with the techniques described herein.

In operation 430, machine learning system 120 calculates and stores, for each of the edges in a graph data structure, one or more attribute values based on one or more transactions occurring between the nodes connected to that edge, according to various embodiments. For example, an edge may include attribute information such as total purchase volume (TPV) between the two nodes, which may also be broken down into TPV in each direction (e.g. quantity of currency sent from one node to the other node in a particular time frame). Other such attribute information may include total quantity of interactions (e.g. number of transactions), number of different funding sources used to make an electronic payment transaction (e.g., node A made 12 payments to node B within 12 months using one bank checking account and one credit card, or node A made 74 payments to node B within 6 months using 25 different credit cards). As will be appreciated, the latter pattern may be more indicative of fraud/collusion, which can be detected via the machine learning techniques disclosed herein. Any attribute information about interactions between two nodes (or even other information) can be added to an edge in the graph as desired. Another type of attribute value for an edge may be disputed claims, e.g., where one account has transacted with another account ten times, and of those ten times, four were disputed as "goods never received" and an addition two were disputed as "goods not as described". Other dispute claim types are also possible, of course. Attribute information for an edge may be stored in the graph data structure along with identifying information for the edge.

In operation 440, machine learning system 120 provides a graph data structure as input to an machine learning (ML) model, according to various embodiments. This may include providing a graph structure to machine learning (ML) training component 122, for example. ML training component 122 may use the provided graph data structure, along with other graph data structures for other graphs, to train machine learning classifier 124 to determine whether a particular user account has engaged in a particular behavior (such as fraud and/or collusion).

Thus, in some embodiments, operation 440 includes providing a label value for the seed node along with the graph data structure to ML training component 122. If the seed node is believed to be a legitimate account that has never engaged in fraud, for example, the label value may indicate "good account". On the other hand, if the seed account is known to have engaged in fraud/collusion, the label value may indicate "bad account".

Method 400 can therefore include creating a trained ML classifier based on many different graphs. More particularly method 400 can include providing a plurality of graph data structures to the machine learning model and the machine learning model producing a trained classifier, based on the plurality of graph data structures, that is configured to accept an unclassified graph data structure and predict a classification value for an unclassified seed node for the unclassified graph data structure.

Training the ML classifier, in the case of a random forest classifier, involves creating a number of decision trees based on the different graphs. Each individual decision tree may represent a subset of all known attribute values for the nodes and edges in the graph, which can help prevent overtraining. The leaves on the decision tree may result in a classification for the seed node account, e.g., good account vs. bad account. Various different criteria can be used to construct the decision trees. E.g., a first decision tree might have two forks [seed account has ten or more transactions in last 2 months, seed account has less than ten transactions in the last 2 months]. If the seed account has 10+ transactions, the next decision in the tree might be [average transaction value of more than $20, average transaction value of $20 or less]. Various levels of depth can be specified for the tree, and eventually the tree will produce a decision (e.g. good account or bad account). Using training data, the individual trees can be revised so that they produce relatively accurate recreations for the known data, by tweaking parameters within the tree (changing the avg. transaction value to $50 from $20, for example). Any of the data in the graph data structure can be used to reach decisions, including any and all aspects of an electronic payment transaction, frequency/timing data for transactions (e.g. number transactions within a particular period, peak number of transactions within a 24 hour window, etc.).

Information about the other nodes in the graph and/or graph-level information can also be used in building ML classifier 124. For example, the graph data structure can contain a percentage of accounts in the graph that were suspended, restricted, or terminated for fraudulent behavior (and this can further be broken down into second-degree accounts or third-degree accounts, for example). A seed account that has a relatively high percentage (compared to "good" accounts) of fraudulent accounts that are immediately connected to it may have a much higher likelihood of being a fraudster account itself. Third-degree accounts may have a weaker correlation, but still provide a positive correlation (e.g. the likelihood of fraud is higher when 20% of the second-degree nodes for a seed account have engaged in fraud vs. 20% of its third-degree nodes being known fraudsters). Nodes may therefore be labeled according to a classification (e.g. if PayPal determines an account to have engaged in fraud, it can be labeled as such and used in the graph as such).

Optimizing individual trees to predict on training data and then combining the results can produce a trained classifier that is then capable of assessing unlabeled data (e.g. determining whether an unknown account is engaging in fraud/collusion). For example, hundreds or thousands of decision trees can be trained and used. If 1,950 out of 2,000 decision trees determine that an account has engaged in collusion/fraud, then this may be very likely to be the case for example. Individual decision trees can also be weighted (e.g. some trees may be more accurate than others in regard to the training data and can be weighted accordingly, where one tree might get 3.5 times the "votes" of another less accurate tree). Once a threshold is reached (which can be defined arbitrarily for a desired level of accuracy) then a decision can be reached. A trained ML classifier can, in some embodiments, also provide an output along with a measure of confidence (e.g., an account is deemed 99% likely to be a good account, or only 12% likely to be a good account, etc.).

Of course, different learning models other than random forest can be used, and the techniques disclosed herein may be adapted as desired for artificial neural networks (ANNs), gradient boosting trees (GBTs), etc. Thus, in one embodiment, graph training data comprising labeled user accounts can be input into a GBT model having particular internal parameters (which may be constructed/determined based on the training data). Output of the GBT model having the particular internal parameters can then be repeatedly compared to the known labels for the accounts. The GBT model can then be altered based on the comparing to refine accuracy of the GBT model. For example a first decision tree can be calculated based on the known data, then a second decision tree can be calculated based on inaccuracies detected in the first decision tree. This process can be repeated, with different weighting potentially given to different trees, to produce an ensemble of trees with a refined level of accuracy significantly above what might be produced from only one or two particular trees.

Accordingly, in other embodiments, an artificial neural network (ANN) model is trained to produce a machine learning classifier 124. Internal parameters of the ANN model (e.g., corresponding to mathematical functions operative on individual neurons of the ANN) are then varied. Output from the ANN model is then compared to known results, during the training process, to determine one or more best performing sets of internal parameters for the ANN model. Thus, many different internal parameter settings may be used for various neurons at different layers to see which settings most accurately predict whether a particular user account is likely to have engaged in a particular behavior, such as fraud and/or collusion.

Figure 5:
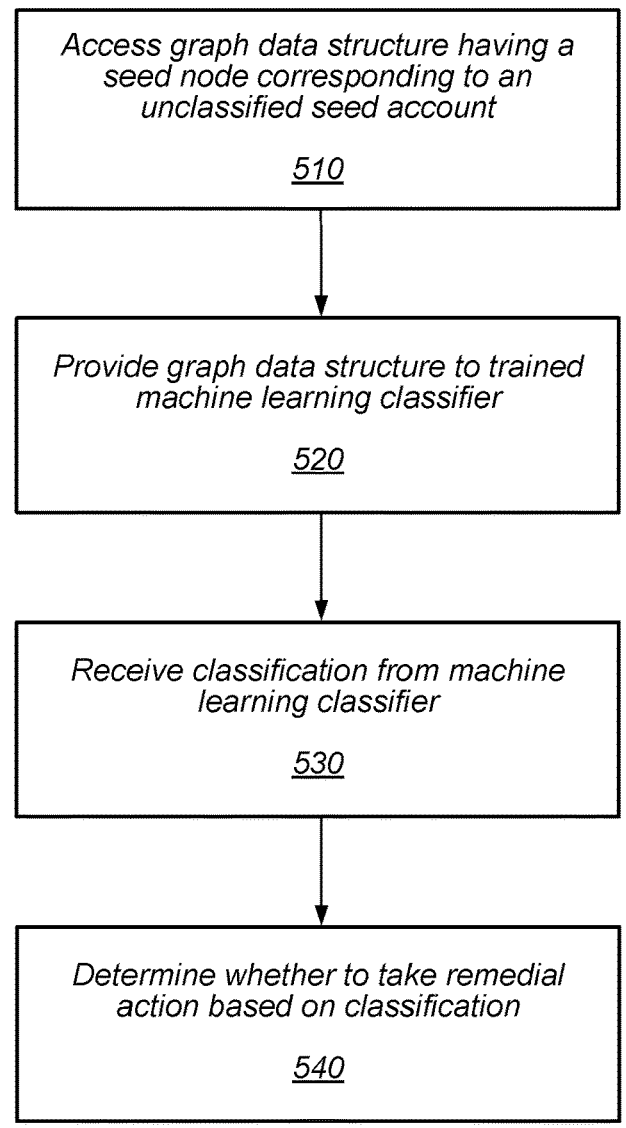
FIG. 5 illustrates a flow diagram of a method that relates to providing a graph data structure to a trained machine learning classifier and receiving a user account classification, according to some embodiments.

Turning to FIG. 5, a flowchart is shown of one embodiment of a method 500 relating to providing a graph data structure to a trained machine learning (ML) classifier and receiving an account classification result, where the ML classifier has been trained in accordance with certain techniques.

Operations described relative to FIG. 5 may be performed, in various embodiments, by any suitable computer system and/or combination of computer systems, including machine learning system 120. For convenience and ease of explanation, however, operations described below will simply be discussed relative to machine learning system 120. Further, various elements of operations discussed below may be modified, omitted, and/or used in a different manner or different order than that indicated. Thus, in some embodiments, machine learning system 120 may perform one or more aspects described below, while another system might perform one or more other aspects.

In operation 510, machine learning system 120 accesses a graph data structure having a seed node that corresponds to an unclassified seed account. This graph data structure may be constructed in accordance with techniques described above. Thus, the graph data structure may have been built using a seed node having a set of edge-connected second-degree nodes and third-degree nodes, the nodes and edges having various attribute values, with the graph data structure also potentially having certain graph-level metadata information, such as a percentage of accounts in the graph that are classified as "good" or "fraudulent", for example), or any other type of metric that might involve calculations from multiple edges or multiple nodes.

In operation 520, machine learning system 120 provides the graph data structure to a trained machine learning (ML) classifier, where the ML classifier was trained using a plurality of graph data structures, according to various embodiments. Thus, the graph data structure can be provided to ML classifier 124, and each of the graphs used in the process of creating a trained ML classifier can be built using operations described above relative to FIG. 4 (e.g. operation 420).

In operation 530, machine learning system 120 receives, from the trained ML classifier, a classification of the seed account. This classification may be binary, such as "account appears legitimate" or "account appears to be engaged in fraud/collusion". A confidence value may also be provided (e.g. 75% confidence account is legitimate).

In operation 540, machine learning system 120 determines whether to take a remedial action based on the classification from operation 530. After an account is classified, for example, machine learning system 120 and/or transaction system 160 (or another system) may take a remedial action against a user account, in some cases.

If an account is deemed to be engaged in fraud/collusion, for example, certain measures may be taken against the user's account. The account may be suspended or have its activities restricted (e.g. limited ability to use system resources or conduct transactions). In the case of electronic payments, the account might be restricted in its ability to withdraw money—a 30 day, 180 day, or some other hold could be put on withdrawing funds. The holder of the account may be notified and/or asked for additional documentation before the account is removed from restricted status. An account can even be terminated. These remedial actions may be taken automatically by a computer but may also be accompanied by human review in some cases. (Note that all actions described herein, including limitations placed on user accounts, will comply with applicable regulatory and privacy laws in different jurisdictions, according to various embodiments.)

Computer-Readable Medium

Figure 6:
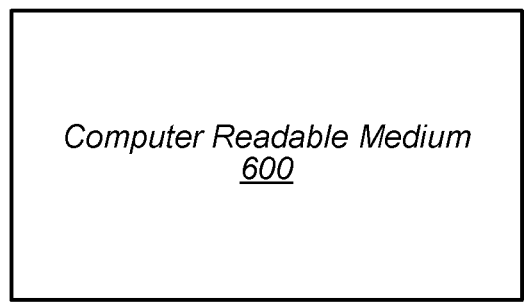
FIG. 6 is a diagram of a computer readable medium, according to some embodiments.

Turning to FIG. 6 a block diagram of one embodiment of a computer-readable medium 600 is shown. This computer-readable medium may store instructions corresponding to the operations of FIG. 4, FIG. 5, and/or any techniques described herein. Thus, in one embodiment, instructions corresponding to machine learning system 120 may be stored on computer-readable medium 600.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 7:
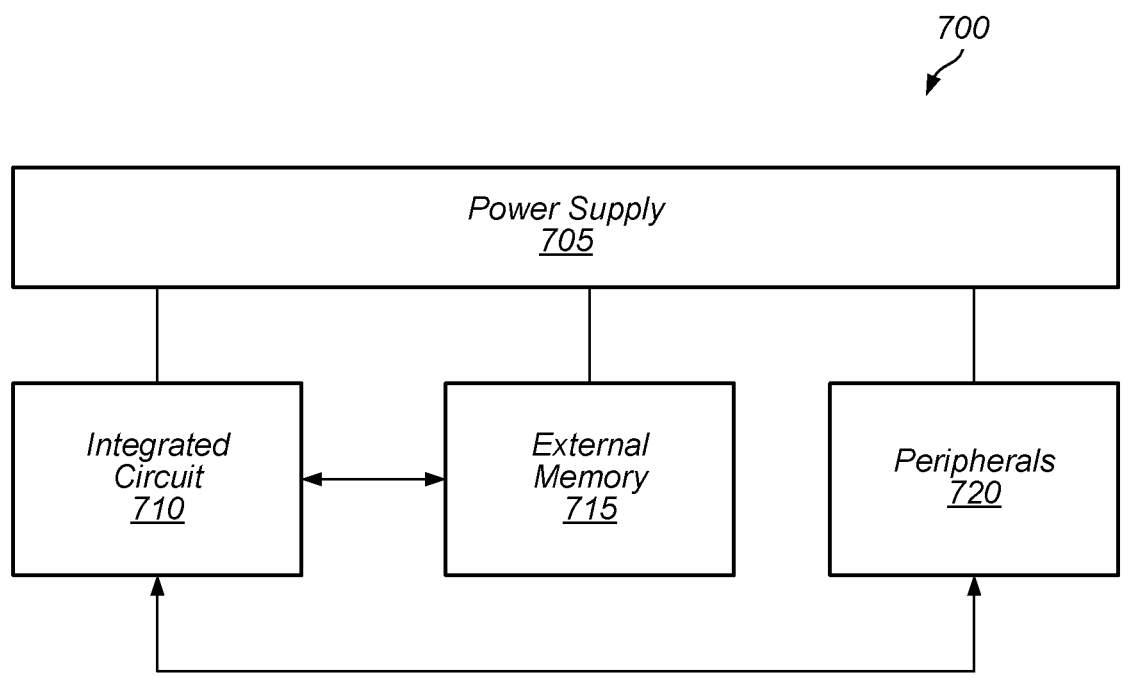
FIG. 7 is a block diagram of a system, according to some embodiments.

In FIG. 7, one embodiment of a computer system 700 is illustrated. Various embodiments of this system may be machine learning system 120, transaction system 160, or any other computer system as discussed above and herein.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as wifi, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices. By way of further explanation, in some embodiments system 700 may include multiple computers or computing nodes that are configured to communicate together (e.g. computing cluster, server pool, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a processor; and
   a non-transitory computer readable medium having stored thereon instructions executable to cause the system to perform operations comprising:
      creating a seed node based on a seed account that satisfies one or more selection criteria;
      creating a graph data structure corresponding to the seed node that includes information on other nodes, corresponding to other user accounts, connected to the seed node, including:
         determining a plurality of second-degree accounts with which the seed account has transacted;
         adding a plurality of second-degree accounts as a plurality of second-degree nodes connected to the seed node in the graph data structure, wherein each second-degree node added has less than a threshold number of connections to other nodes;
         creating a first group of edges in the graph data structure indicating one or more respective transactions between the seed node and each of the plurality of second degree nodes; and
         for each of the plurality of second-degree nodes:
            determining, for that second-degree node, whether one or more third-degree accounts exist that have transacted with a second-degree account for that second-degree node;
            if the one or more third-degree accounts exist, adding the one or more third-degree accounts as one or more third-degree nodes to the graph data structure; and
            if the one or more third-degree accounts exist, creating a second respective group of edges in the graph data structure indicating links between that second-degree node and the one or more third-degree nodes;
      for each of the edges in the graph data structure, calculating and storing, in the graph data structure one, or more attribute values based on one or more transactions occurring between the nodes connected to that edge; and
      providing the graph data structure as an input to a machine learning model.

2. The system of claim 1, wherein providing the graph data structure as input to the machine learning model comprises providing a label value for the seed node to the machine learning model, wherein the label value indicates whether the seed node corresponds to a user account that has engaged in behavior prohibited by an authorized use policy applicable to the user account.

3. The system of claim 1, wherein the operations further comprise:
   providing a plurality of graph data structures to the machine learning model; and
   the machine learning model producing a trained classifier, based on the plurality of graph data structures, that is configured to accept an unclassified graph data structure and predict a classification value for an unclassified seed node for the unclassified graph data structure.

4. The system of claim 3, wherein the classification value is a categorization of whether an account is likely to engage in behavior prohibited by an authorized use policy applicable to the account.

5. The machine learning system of claim 3, wherein the classification value has a corresponding confidence value.

6. The system of claim 1, wherein the one or more attribute values for at least one of the edges in the graph include a dispute claim type for one or more transactions.

7. The system of claim 1, wherein the operations further comprise calculating and storing graph-level attributes for the graph data structure based on attribute values for the nodes in the graph.

8. The system of claim 7, wherein the graph-level attributes include a proportion of nodes in the graph corresponding to accounts believed to have violated an acceptable use policy.

9. A method for machine-learning based account classification, comprising:
   accessing, by a computer system, a graph data structure having a seed node that corresponds to an unclassified seed account;
   providing, by the computer system, the graph data structure to a trained machine learning (ML) classifier, wherein the ML classifier was trained using a plurality of graph data structures each built using operations comprising:
      determining one or more second-degree accounts with which a seed account for the graph data structure has transacted;
      adding the one or more second-degree accounts as one or more second-degree nodes connected to the seed node in the graph data structure, wherein each second-degree node added has less than a threshold number of connections to other nodes;
      creating a first group of edges in the graph data structure indicating links between the seed node and each of the one or more second degree nodes; and
      for each of the one or more second-degree nodes:
         determining, for that second-degree node, whether one or more third-degree accounts exist that have transacted with a second-degree account for that second-degree node;
         if the one or more third-degree accounts exist, adding the one or more third-degree accounts as one or more third-degree nodes to the graph data structure; and
         if the one or more third-degree accounts exist, creating a second respective group of edges in the graph data structure indicating links between that second-degree node and the one or more third-degree nodes; and
   receiving, by the computer system from the trained ML classifier, a classification of the seed account.

10. The method of claim 9, wherein the computer system comprises a plurality of computing devices linked via one or more networks, and wherein the computer system comprises the trained ML classifier.

11. The method of claim 9, further comprising:
    determining, by the computer system, whether to take a corrective action against the seed account based on the classification.

12. The method of claim 11, wherein the classification indicates the seed account is believed to have engaged in collusion, further comprising taking corrective action including causing a suspension of transaction privileges for the seed account.

13. The method of claim 9, wherein the operations to build each of the plurality of graph data structures further comprise:

for each of the edges in the graph data structure, calculating and storing, in the graph data structure, one or more attribute values based on one or more transactions occurring between the nodes connected to that edge.

14. The method of claim 9, wherein the ML classifier comprises an artificial neural network (ANN) based classifier.

15. The method of claim 9, wherein the classification of the seed account indicates that the seed account is likely to violate or has violated an authorized use policy (AUP) applicable to the seed account.

16. The method of claim 9, further comprising:

based on the classification of the seed account, denying one or more electronic transactions requested by the seed account.

17. The method of claim 16, wherein the denied one or more electronic transactions include one or more electronic monetary transactions to purchase an item.

18. A non-transitory computer-readable medium having stored thereon instructions that are executable by a computer system to cause the computer system to perform operations comprising:

accessing a graph data structure having a seed node that corresponds to an unclassified seed account;

providing the graph data structure to a trained machine learning (ML) classifier, wherein the ML classifier was trained using a plurality of graph data structures each built using operations comprising:

determining one or more second-degree accounts with which a seed account for the graph data structure has transacted;

adding the one or more second-degree accounts as one or more second-degree nodes connected to the seed node in the graph data structure, wherein each second-degree node added has less than a threshold number of connections to other nodes;

creating a first group of edges in the graph data structure indicating links between the seed node and each of the one or more second degree nodes; and for each of the one or more second-degree nodes:

determining, for that second-degree node, whether one or more third-degree accounts exist that have transacted with a second-degree account for that second-degree node;

if the one or more third-degree accounts exist, adding the one or more third-degree accounts as one or more third-degree nodes to the graph data structure; and if the one or more third-degree accounts exist, creating a second respective group of edges in the graph data structure indicating links between that second-degree node and the one or more third-degree nodes; and receiving, from the trained ML classifier, a classification of the seed account.

19. The non-transitory computer-readable medium of claim 18, wherein one or more attribute values for each of a plurality of the edges in the graph include a total purchase volume (TPV) for electronic payment transactions engaged in between nodes connected to that edge.

20. The non-transitory computer-readable medium of claim 18, wherein the operations further comprise causing a remedial action to be taken against the seed account based on the classification of the seed account.

\* \* \* \* \*